(12) United States Patent
Lai et al.

(10) Patent No.: US 11,130,368 B2
(45) Date of Patent: Sep. 28, 2021

(54) CASTER

(71) Applicant: COLSON CASTER GUANGZHOU LTD., Guangdong (CN)

(72) Inventors: Hang Lai, Guangdong (CN); Zhiying Zeng, Guangdong (CN)

(73) Assignee: COLSON CASTER GUANGZHOU LTD., Guangzhou (CN)

( * ) Notice: Subject to any disclaimer, the term of this patent is extended or adjusted under 35 U.S.C. 154(b) by 0 days.

(21) Appl. No.: 16/830,261

(22) Filed: Mar. 25, 2020

(65) Prior Publication Data

US 2020/0331294 A1    Oct. 22, 2020

(30) Foreign Application Priority Data

Apr. 18, 2019  (CN) .................. 201920536692.X

(51) Int. Cl.
*B60B 33/00* (2006.01)
(52) U.S. Cl.
CPC ...... *B60B 33/0028* (2013.01); *B60B 33/0068* (2013.01); *B60B 33/0042* (2013.01)
(58) Field of Classification Search
CPC . Y10T 16/184; Y10T 16/212; Y10T 16/1857; Y10T 16/186; Y10T 16/1867; Y10T 16/196; B60B 33/002; B60B 33/00; B60B 33/0028; B60B 33/0039; B60B 33/0042; B60B 33/0047; B60B 33/0057; B60B 33/045; B60B 33/0063; B60B 9/06; B60B 9/005; B60B 2900/1331; B60B 33/0002; B60B 33/0049; B60B 33/0068; B60B 33/0073; B60B 33/0081; B60B 2200/20; B60B 2360/00; B60B 2380/12; B60B 2900/571; B60B 2900/572; B60G 11/00; B60G 11/14; B60G 11/15; B60G 11/16; B60G 11/006; B60G 3/01; A45C 5/14; A45C 2005/148

See application file for complete search history.

(56) References Cited

U.S. PATENT DOCUMENTS

| | | | | |
|---|---|---|---|---|
| 1,617,984 A * | 2/1927 | Biggio | .................. | A63C 17/02 280/11.19 |
| 2,541,514 A * | 2/1951 | Herold | ................ | B60B 33/0042 295/8.5 |
| 2,618,490 A * | 11/1952 | Frischmann | ........ | B60B 33/0063 280/43.12 |
| 4,072,373 A * | 2/1978 | Black | .................. | B60B 33/0028 384/537 |

(Continued)

FOREIGN PATENT DOCUMENTS

JP     2009083706 A  *  4/2009

*Primary Examiner* — Chuck Y Mah

(57) ABSTRACT

The invention provides a caster comprising a bracket, a first transmission device and two wheels. The two wheels are connected by a transmission screw and are fixed to the bracket. The first transmission device comprises an annular retaining portion and a plurality of first balls, the plurality of first balls are equiangularly arranged in a circumferential direction of the annular retaining portion, and opposite sides of the annular retaining portion are respectively embedded in the respective wheels. The caster of the invention can solve the problems in the prior art that it is difficult to control the gap between the two wheels, the resistance generated between the two wheels is large and noise is easily generated.

6 Claims, 6 Drawing Sheets

(56) References Cited

U.S. PATENT DOCUMENTS

| | | | | |
|---|---|---|---|---|
| 4,318,204 A * | 3/1982 | Black | ................ | B29C 45/1459 |
| | | | | 16/46 |
| 4,706,329 A * | 11/1987 | Screen | ................ | B60B 33/0028 |
| | | | | 16/47 |
| 5,075,924 A * | 12/1991 | Estkowski | .......... | B60B 33/0052 |
| | | | | 16/18 A |
| 5,184,373 A * | 2/1993 | Lange | .................... | B60B 33/00 |
| | | | | 16/35 R |
| 5,568,671 A * | 10/1996 | Harris | ................ | B60B 33/0002 |
| | | | | 16/18 R |
| 6,352,366 B1 * | 3/2002 | Schneeberger | ..... | F16C 29/0623 |
| | | | | 384/45 |
| 6,880,203 B1 * | 4/2005 | Aubin | ................ | B60B 33/0028 |
| | | | | 16/31 R |
| 7,017,228 B2 * | 3/2006 | Silverstein | .......... | B60B 33/0005 |
| | | | | 16/18 R |
| 9,056,524 B2 * | 6/2015 | Lee | .................... | B60B 33/0047 |
| 2014/0331450 A1 * | 11/2014 | Harrelson | ............... | B60B 3/001 |
| | | | | 16/18 R |

* cited by examiner

CASTER

CROSS REFERENCE TO RELATED APPLICATIONS

The present application claims the benefit of Chinese Patent Application No. 201920536692.X filed on Apr. 18, 2019, the contents of which are incorporated herein by reference in their entirety.

FIELD OF THE INVENTION

The invention relates to the technical field of mechanical equipment, in particular to a caster.

BACKGROUND OF THE INVENTION

Casters are common cart accessories that are typically mounted on the foot of a cart or other mechanical equipment to facilitate movement of the cart or other mechanical equipment. At present, a caster on the market includes two wheels, and the movement of the two wheels enables the appliance to move flexibly and conveniently. The existing casters have the following disadvantages: (1) it is difficult to control the gap between the two wheels in actual production; and (2) during the actual use of the caster, the two wheels will rub against each other due to the influence of force and other factors such as the swinging of the wheels, especially when the two wheels are in different directions or turn forward and reverse, which further results in large resistance between the wheels and easy generation of noise.

SUMMARY OF THE INVENTION

Based on this, it is an objective of the invention to provide a caster which is to overcome the deficiencies in the prior art that it is difficult to control the gap between the two wheels, the resistance generated between the two wheels is large and noise is easily generated.

The technical solution of the invention is to provide a caster comprising a bracket, a first transmission device and two wheels, the two wheels are connected by a transmission screw and fixed to the bracket; and the first transmission device comprises an annular retaining portion and a plurality of first balls, the plurality of first balls are arranged equiangularly in a circumferential direction of the annular retaining portion, and opposite sides of the annular retaining portion are respectively embedded in the respective wheels.

Optionally, the annular retaining portion comprises two ball washers, i.e., a first ball washer and a second ball washer, and the first ball washer and the second ball washer are each embedded in the respective wheels.

Optionally, the wheel comprises a wheel tread, a wheel core and a wheel cover, the wheel tread is disposed on an outer surface of the wheel core, and the wheel cover and the wheel core are connected by a second transmission device; the wheel core is provided with a seat ring, and the first ball washer and the second ball washer are each embedded in the respective seat rings.

Optionally, the second transmission device comprises a plurality of second balls, one side face of the wheel core is provided with a first ball track, one side face of the wheel cover is provided with a second ball track, and the first ball track and the second ball track are oppositely disposed;

the plurality of the second balls are scrollably connected between the first ball track and the second ball track.

Optionally, the first balls and the second balls are POM balls.

Optionally, the wheel cover is provided with a shaft hole through which the transmission screw passes, and both ends of the transmission screw are fixed to the bracket by fasteners.

Optionally, the wheel tread is connected with the wheel core by a lock catch.

The implementation of the embodiments of the invention has the following beneficial effects:

The caster of the invention is provided with the annular retaining portion, and opposite sides of the annular retaining portion are respectively embedded in the respective wheels, so that the two wheels are connected by the annular retaining portion, and the gap between the two wheels is controlled;

The caster of the invention is provided with a plurality of first balls, and the plurality of first balls are arranged equiangularly in the circumferential direction of the annular retaining portion; during the rolling process of the wheels, the rolling of the plurality of first balls changes the friction between the two wheels to be rolling friction, so that the rolling between the two wheels is smoother, and when the two wheels are in different directions or turn forward and reverse, the rolling of the first balls can reduce the resistance between the two wheels and effectively reduce frictional noise between the two wheels; and The caster of the invention can effectively control the gap between the two wheels and the resistance between the two wheels, and reduce the frictional noise, which facilitates the production of the caster and thus has certain generalization.

DESCRIPTION OF THE REFERENCE NUMBERS

1. bracket; 2. brake device; 21. brake pin sleeve; 22. brake screw; 23. brake block; 24. brake surface; 25. brake pad; 3. first transmission device; 31. annular retaining portion; 311. first ball washer; 312. second ball washer; 32. first ball; 4. wheel; 41. wheel tread; 42. wheel core; 43. wheel cover; 5. transmission screw; 6. second transmission device; 61. second ball; 7. first ball track; 8. second ball track; 9. shaft hole; 10. shock absorbing portion; 101. base plate; 102. lower bead disk; 103. third ball; 104. fourth ball; 11. first positioning block; 12. first positioning groove; 13. second positioning block; 14. second positioning groove; 15. rivet; 16. elastic member; 17. threaded hole.

DETAILED DESCRIPTION OF PREFERRED EMBODIMENTS

The technical solutions in the embodiments of the invention will be clearly and completely described in conjunction with the drawings in the embodiments of the invention. It is obvious that the described embodiments are only a part, not all, of the embodiments of the invention. In view of the embodiments of the invention, all other embodiments obtained by those skilled in the art without paying creative efforts are within the protection scope of the invention.

In the description of the invention, it is to be understood that the orientation or positional relationship indicated by the terms "upper", "lower", "left", "right", "top", "bottom" or the like is based on the orientation or positional relationship of the drawings, is merely for the convenience of the description of the invention, and is not intended to indicate or imply that the stated device or component has a specific orientation and is constructed and operated in a specific orientation, so that it is not understood as limitation to the invention.

Figure 1:
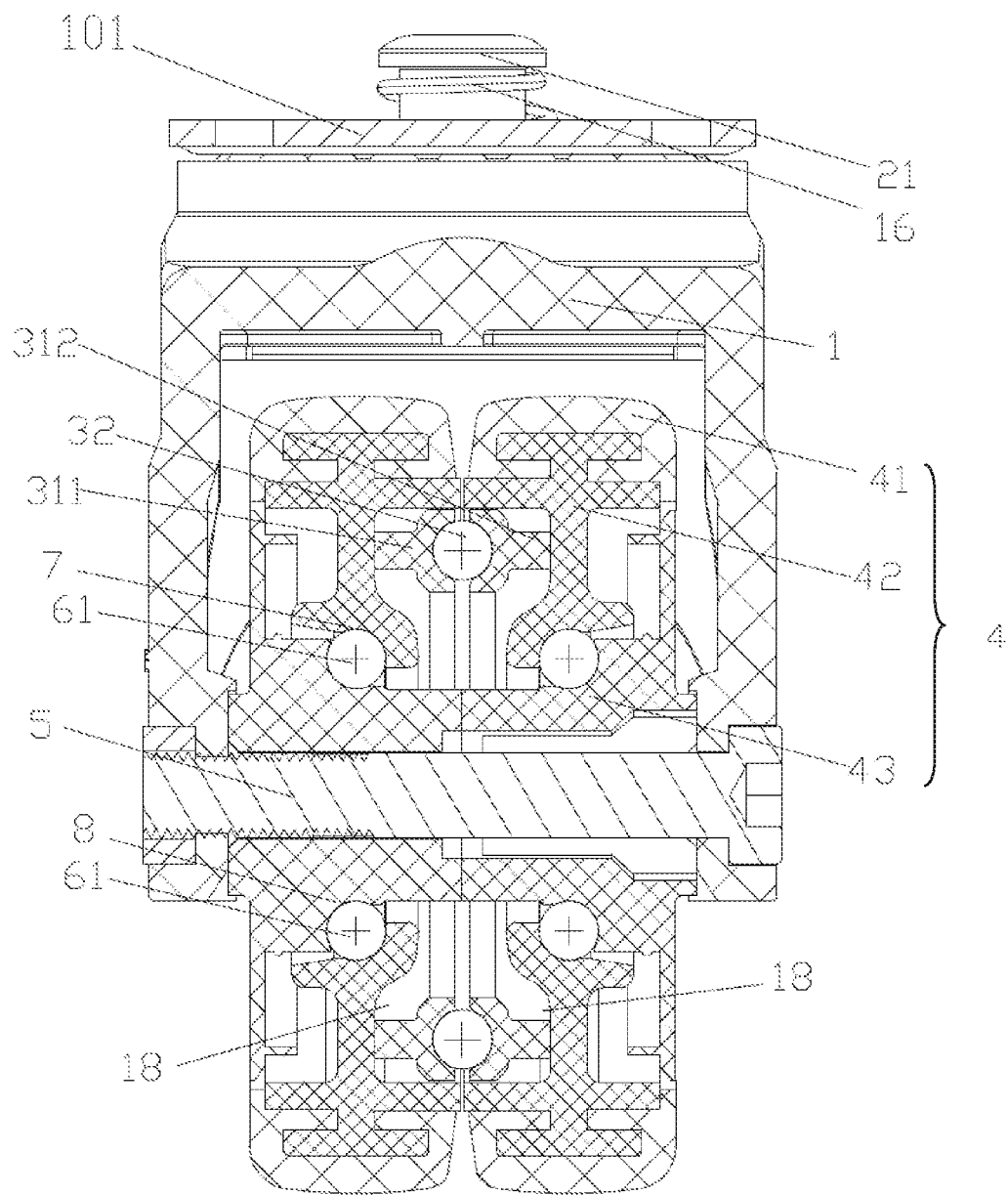
FIG. 1 is a structural schematic view 1 of the caster according to the invention.
Figure 2:
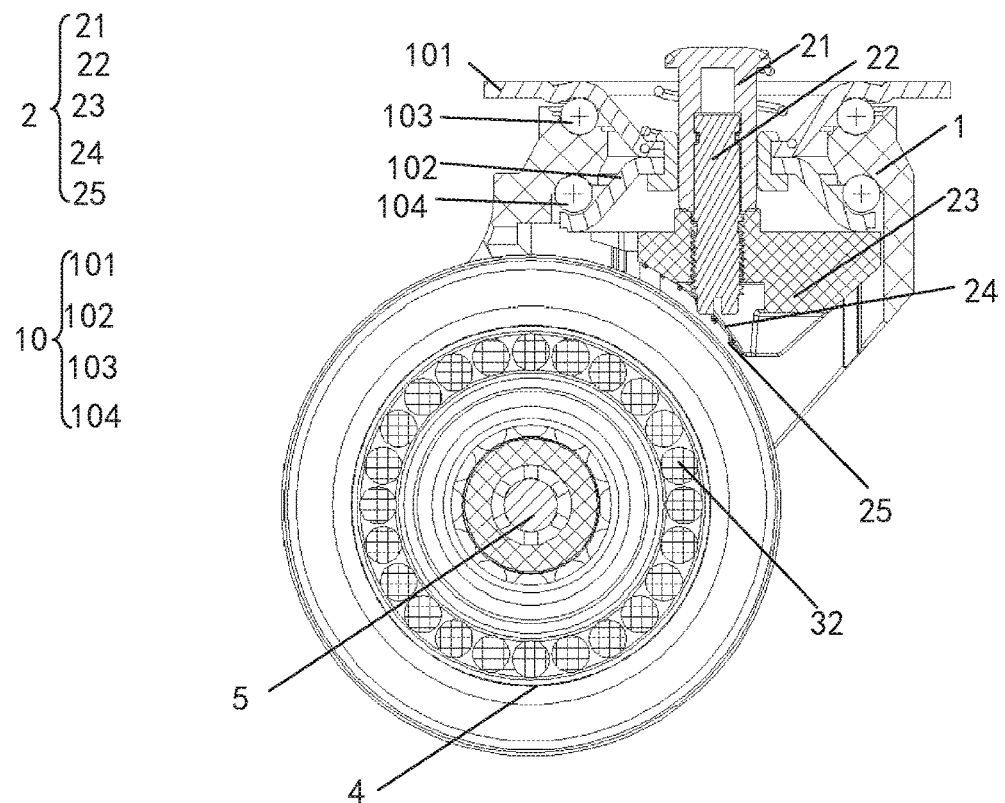
FIG. 2 is a structural schematic view 2 of the caster according to the invention.
Figure 3:
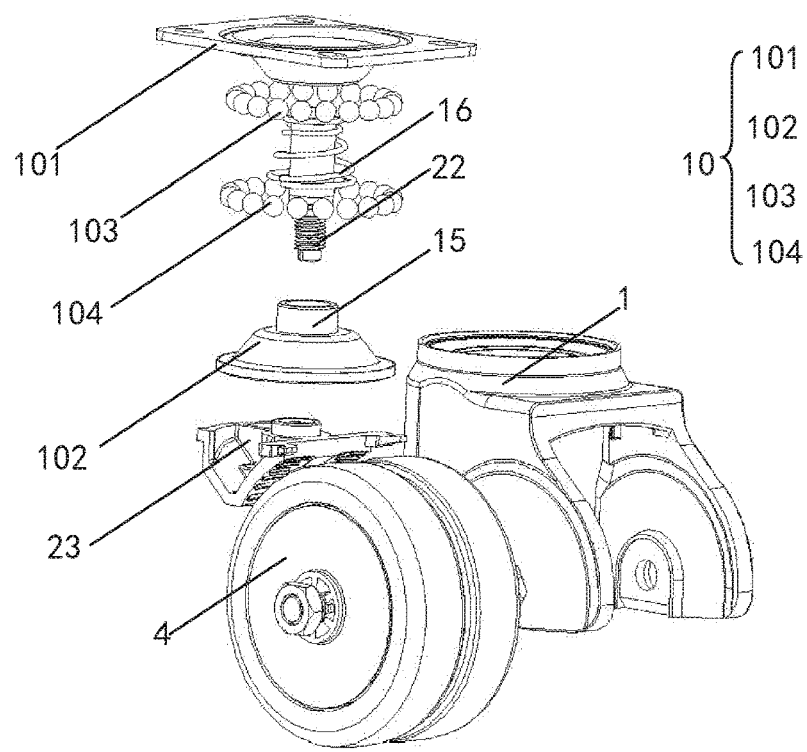
FIG. 3 is a structural schematic view 3 of the caster according to the invention.
Figure 4:
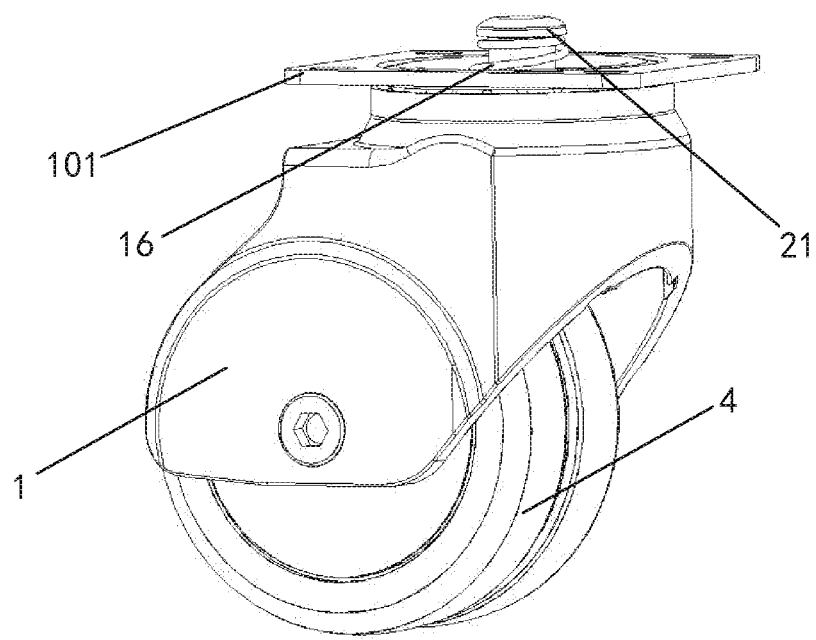
FIG. 4 is a structural schematic view 4 of the caster according to the invention.
Figure 5:
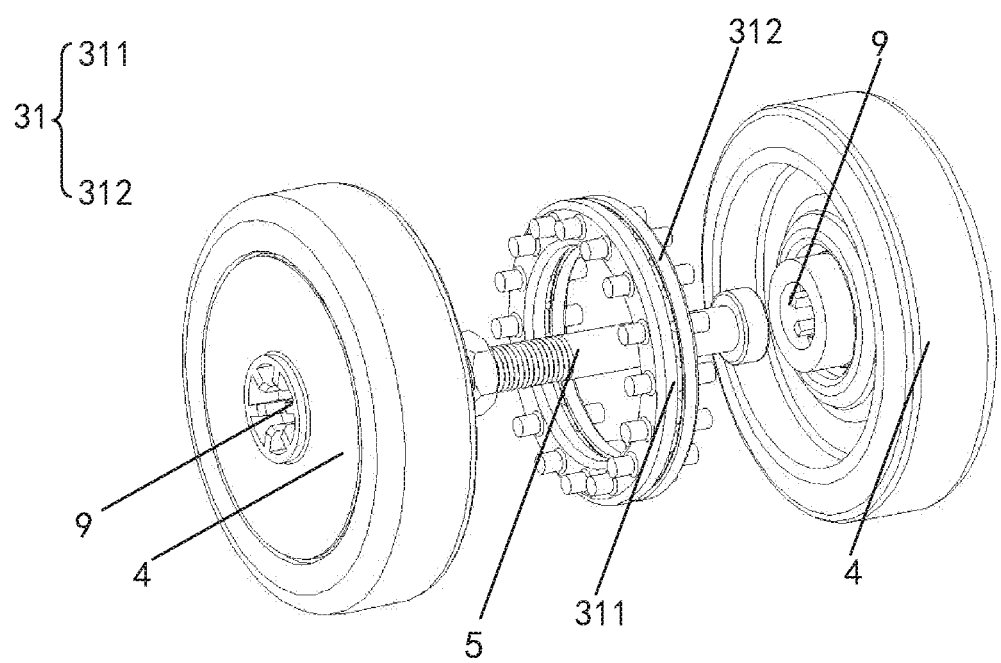
FIG. 5 is a structural schematic view of the wheel and the first transmission device according to the invention.
Figure 6:
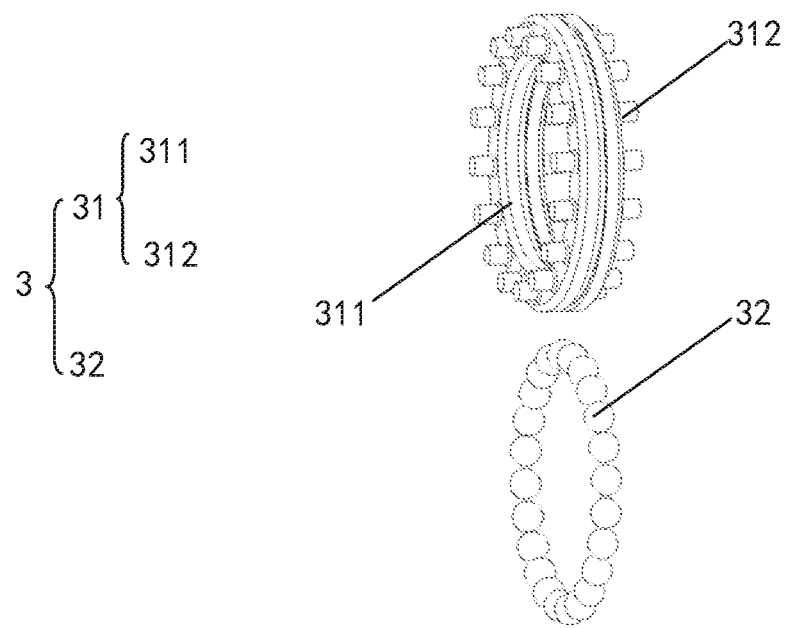
FIG. 6 is a structural schematic view of the first transmission device according to the invention.
Figure 7:
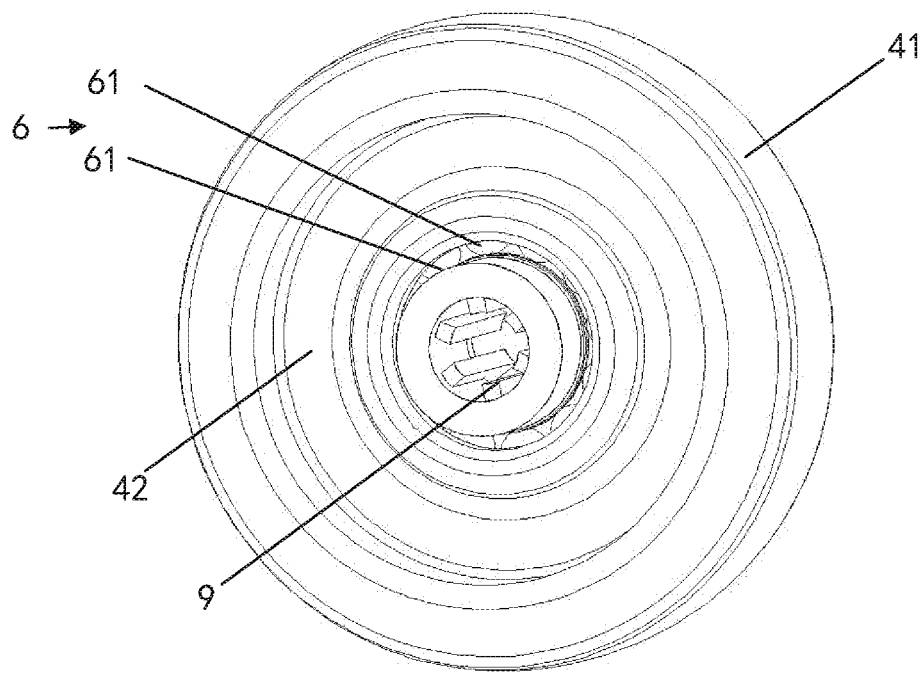
FIG. 7 is a structural schematic view of the wheel according to the invention.
Figure 8:
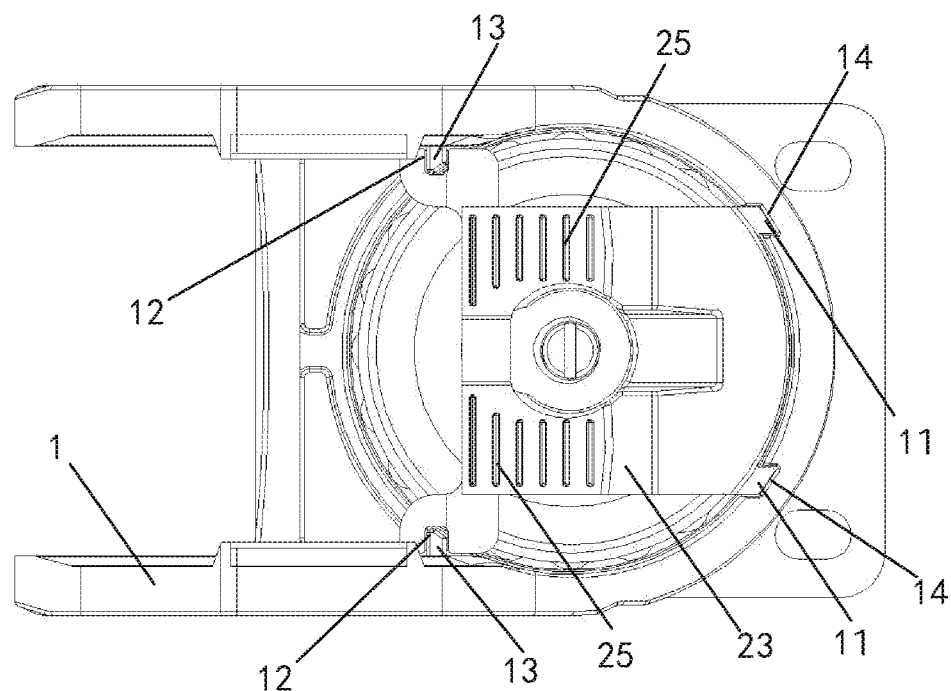
FIG. 8 is a schematic view showing the connection structure of the bracket and a brake device according to the invention.
Figure 9:
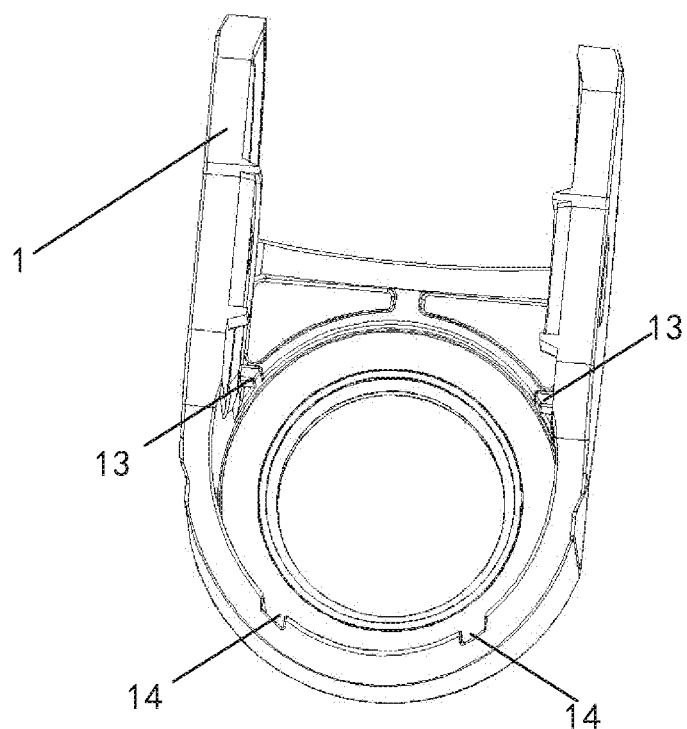
FIG. 9 is a structural schematic view of the bracket according to the invention.
Figure 10:
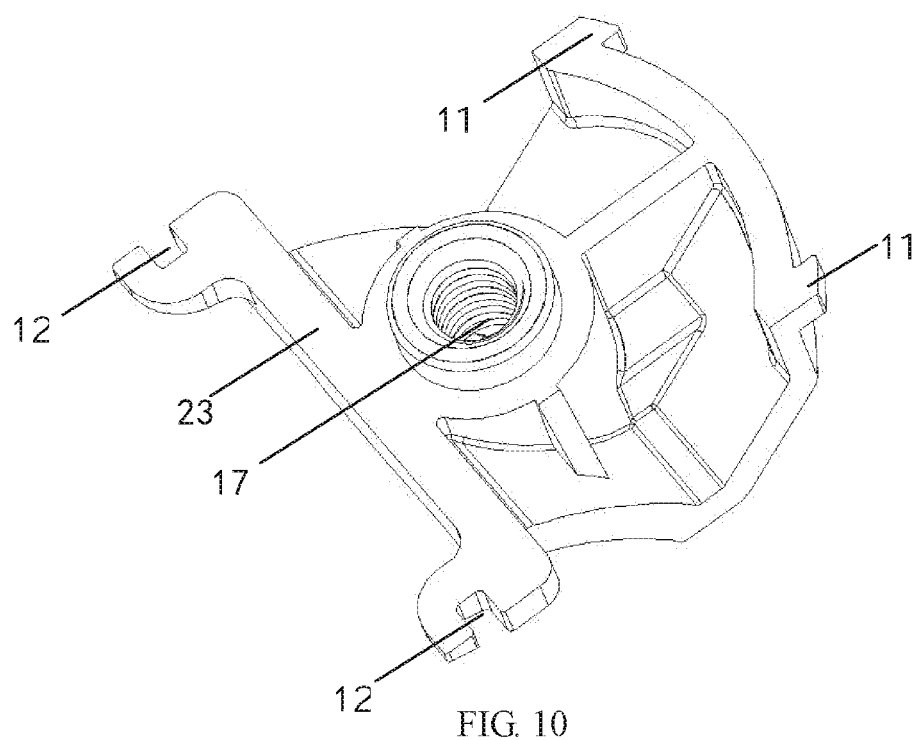
FIG. 10 is a structural schematic view of the brake block according to the invention.

As shown in FIGS. 1 to 10, a caster provided in an embodiment of the invention comprises a bracket 1, a first transmission device 3, and two wheels 4. The two wheels 4 are connected by a transmission screw 5, and the two wheels 4 are fixed to the bracket 1 but spaced apart from one another with a gap with the first transmission device 3, as will be described below.

The first transmission device 3 comprises an annular retaining portion 31 and a plurality of first balls 32. The plurality of first balls 32 are equiangularly arranged in a circumferential direction of the annular retaining portion 31, and opposite sides of the annular retaining portion 31 are respectively embedded in the respective wheels 4.

Based on the above arrangement, the caster of the invention is provided with the annular retaining portion 31, and opposite sides of the annular retaining portion 31 are respectively embedded in the respective wheels 4, so that the two wheels 4 are connected by the annular retaining portion 31, thereby establishing and controlling the gap between the wheels 4.

The caster of the invention is provided with the plurality of first balls 32, and the plurality of first balls 32 are arranged equiangularly in a circumferential direction of the annular holding portion 31; during the rolling process of the two wheels 4, the rolling of the plurality of first balls 32 changes the friction between the two wheels 4 to be rolling friction, so that the rolling of the two wheels 4 is smoother, and when the two wheels 4 are in different directions or turn forward and reverse, the rolling of the first balls 32 can reduce the resistance between the two wheels 4 and effectively reduce frictional noise between the two wheels 4.

Therefore, the caster of the invention can effectively control the gap between the two wheels 4 and the resistance between the two wheels 4, and reduce the friction noise, which facilitates the production of the caster and thus has certain generalization.

In the present embodiment, as shown in FIGS. 1 to 7, in order to conveniently establish and control the gap between the two wheels 4, the annular holding portion 31 comprises two ball washers, i.e., a first ball washer 311 and a second ball washer 312, and the first ball washer 311 and the second ball washer 312 are each embedded in the respective wheels 4. Specifically, the plurality of first balls 32 roll in the space formed by the first ball washer 311 and the second ball washer 312, which not only reduces the noise between the two wheels 4, but also reduces the resistance between the two wheels 4, so that the two wheels 4 are operated by a user more labor-savingly and flexibly when they rotate in the same direction or different directions.

In the present embodiment, as shown in FIGS. 1 to 7, the wheel 4 includes a wheel tread 41, a wheel core 42 and a wheel cover 43. The wheel tread 41 is disposed on an outer surface of the wheel core 42, and the wheel cover 43 and the wheel core 42 are connected by a second transmission device.

The wheel core 42 is provided with a seat ring 18, and the first ball washer 311 and the second ball washer 312 are each embedded in the seat ring 18. Specifically, the seat ring 18 can provide a space for accommodating the first ball washer 311 and the second ball washer 312, so that the first ball washer 311 and the second ball washer 312 can be embedded in the respective wheel cores 42.

The second transmission device 6 enables the wheel cover 43 and the wheel core 42 to simultaneously bear a greater axial load, radial load and torque, thereby ensuring the service life of the caster.

In the present embodiment, as shown in FIGS. 1 to 7, the second transmission device 6 comprises a plurality of second balls 61. One side face of the wheel core 42 is provided with a first ball track 7, one side face of the wheel cover 43 is provided with a second ball a track 8, and the first ball track 7 and the second ball track 8 are oppositely disposed.

The plurality of second balls 61 are scrollably connected between the first ball track 7 and the second ball track 8. Specifically, the first ball track 7 is better matched with the second ball track 8 and the second balls 61, so that when the second balls 61 slide between the first ball track 7 and the second ball track 8, the second balls 61 can transmit an axial load or a radial load or a torque between the wheel cover 43 and the wheel core 42, thereby not only reducing the number of parts, but also reducing weight and cost of the caster.

In the present embodiment, as shown in FIGS. 1 to 7, the first balls 32 and the second balls 61 are POM balls that have a smaller specific gravity than steel bearings so that the caster is lightweight.

In the present embodiment, as shown in FIGS. 1 to 7, the wheel cover 43 is provided with a shaft hole 9 through which the transmission screw 5 passes, and both ends of the transmission screw 5 are fixed to the bracket 1 by fasteners. A user can directly install the transmission screw 5, so that the installation process of the transmission screw 5 is reduced, the operation is simple, and the cost is greatly reduced, which are convenient for the user's operation.

In the present embodiment, as shown in FIGS. 1 to 7, both ends of the transmission screw 5 are fixed to the bracket 1 by bolts, thereby rendering installation convenient and quick.

In the present embodiment, as shown in FIGS. 1 to 7, the wheel tread 41 and the wheel core 42 are connected by a lock catch.

In the present embodiment, as shown in FIGS. 1, 2, 3, 4, 9 and 10, the caster of the invention further comprises a brake device 2 which comprises a brake pin sleeve 21, a brake screw 22 and a brake block 23. The bracket 1 is connected with the shock absorbing portion 10 which is located at the top end of the brake block 23. The brake screw 22 is slidably connected to the shock absorbing portion 10 and the brake block 23 which is located at the upper portion of the wheel 4. The upper portion of the brake screw 22 is sleeved with the brake pin sleeve 21, and an elastic member 16 is connected between the brake pin sleeve 21 and the shock absorbing portion 10. Specifically, when a user brakes the two-wheel caster, the user applies a downward force to the brake pin sleeve 21, then the elastic member 16 is in a compressed state, the brake screw 22 moves downward, and the bottom of the brake block 23 is pressed against with the wheel 4, and the wheel 4 is stopped. When a user relieves the brake of the two-wheeled caster, the user does not apply a force to the brake pin sleeve 21, and the elastic member 16 changes from the compressed state to an extended state, the brake screw 22 moves upward under the elastic action of the elastic member 16, and the bottom of the brake block 23 is separated from the wheel 4, so that the wheel 4 is released from brake.

Therefore, in the invention, the elastic member 16, the brake screw 22 and the brake block 23 cooperate with each other, and the brake screw 22 drives the brake block 23 to move up and down, so that the brake stroke can be controlled and the problems of failed brake due to worn wheels and unstable brake structure of the caster in use.

In the present embodiment, as shown in FIGS. 1, 2, 3, 4, 8, 9, and 10, in order to improve the braking effect of the brake block 23, the bottom of the brake block 23 is a brake surface 24 that cooperates with the wheels 4, and the brake surface 24 is provided with a plurality of brake pads 25 at equally spaced intervals. Specifically, the brake surface 24 has an arc shape, so that the brake surface 24 is better in contact with the wheels 4. By providing the brake pads 25, when the brake pads 25 are in contact with the wheels 4, the friction between the brake pads 25 and the wheels 4 can stop the wheels 4 from rotating.

In the present embodiment, as shown in FIGS. 1, 2, 3, 4, 8, 9, and 10, in order to prevent the brake block 23 from deflecting during the up-and-down movement, the top of the brake block 23 is provided with two first positioning blocks 11 that are oppositely disposed and two first positioning slots 12 that are oppositely disposed, and inside of the bracket 1 is provided with two second positioning blocks 13 that are oppositely disposed and two second positioning slots 14 that are oppositely disposed.

The first positioning blocks 11 are each slidably connected to the respective second positioning slots 14, and the second positioning blocks 13 are each slidably connected to the respective first positioning slots 12. Specifically, when the brake block 23 moves up and down, the brake block 23 can move along a fixed trajectory in the straight direction due to the cooperative positioning between the first positioning blocks 11 and the second positioning slots 14 and the cooperative positioning between the second positioning blocks 13 and the first positioning slots 12, so as to achieve a stable braking performance.

In the present embodiment, as shown in FIGS. 1, 2, 3, 4, 8, 9, and 10, in order to facilitate rotation of the bracket 1, the shock absorbing portion 10 comprises a base plate 101, a lower bead disk 102, a plurality of third balls 103, and a plurality of fourth balls 104. The top of the base plate 101 is detachably connected to the bracket 1, the bottom of the base plate 101 is detachably connected to the bottom of the lower bead disk 102, the plurality of third balls 103 are scrollably connected to the base plate 101 and the bracket 1, and the plurality of fourth balls 104 are scrollably connected between the bracket 1 and the lower bead disk 102. Specifically, the plurality of third balls 103 are freely rotatable between the base plate 101 and the bracket 1, and the plurality of fourth balls 104 are freely rotatable between the bracket 1 and the lower bead disk 102, so that the resistance to rotation of the bracket 1 can be reduced when the bracket 1 is rotated.

The connection between the base plate 101 and the bracket 1 and the connection between the base plate 101 and the lower bead disk 102 are detachable connection. The base plate 101 and the lower bead disk 102 are connected by a rivet 15, and the base plate 101 and the bracket 1 are connected by a bolt, so that the installation and dismantling between the base plate 101 and the bracket 1, between the base plate 101 and the lower bead disk 102 is easy.

In the present embodiment, as shown in FIGS. 1, 2, 3, 4, 8, 9, and 10, in order to facilitate the installation and dismantling between the brake screw 22 and the brake block 23, the brake block 23 is provided with a threaded hole 17, and the brake screw 22 is screwed to the threaded hole 17. Specifically, the lower portion of the brake screw 22 is provided with a thread, and the lower portion of the brake screw 22 is screwed to the threaded hole 17, so that the brake screw 22 is less prone to loosening, and the connective stability between the brake screw 22 and the brake block 23 can be ensured.

In the present embodiment, as shown in FIGS. 1, 2, 3, 4, 8, 9, and 10, the elastic member 16 is a spring, and the spring has a good elastic function, which facilitates reset of the brake screw 22.

In summary, the caster of the invention is provided with an annular retaining portion 31, and opposite sides of the annular retaining portion 31 are respectively embedded in the respective wheels 4, so that the two wheels 4 are connected by the annular retaining portion 31, and the gap between the two wheels 4 can be controlled.

The caster of the invention is provided with a plurality of first balls 32, and the plurality of first balls 32 are arranged equiangularly in the circumferential direction of the annular holding portion 31. During the rolling process, the rolling of the plurality of first balls 32 changes the friction between the two wheels 4 to be rolling friction, so that the rolling between the two wheels 4 is smoother, and when the two wheels 4 are in different directions or turn forward and reverse, the rolling of the first balls 32 can reduce the resistance between the two wheels 4 and effectively reduce frictional noise of the two wheels 4.

Therefore, the caster of the invention can effectively control the gap between the two wheels 4 and the resistance between the two wheels 4, and reduce the frictional noise, which facilitate the production of the caster and thus have certain generalization.

It should be understood that the terms "first", "second", and the like are used in the invention to describe various information, but such information should not be limited to these terms, and these terms are only used to distinguish the same type of information from one another. For example, the "first" information may also be referred to as the "second" information, and similarly, the "second" information may also be referred to as the "first" information, without departing from the scope of the invention.

The above-described embodiments are preferred embodiments of the invention. It should be noted that a number of variations and modifications may be made by those skilled in the art without departing from the spirit and scope of the invention, which also fall into the scope of protection of the invention.

What is claimed is:

1. A caster, wherein the caster comprises a bracket, a first transmission device and two wheels, the two wheels are connected by a transmission screw and fixed to the bracket; and the first transmission device comprises an annular retaining portion and a plurality of first balls, the plurality of first balls are arranged equiangularly in a circumferential direction of the annular retaining portion;

wherein the annular retaining portion comprises a first ball washer and a second ball washer, the first ball washer and the second ball washer are each embedded in the respective wheels; and the plurality of first balls roll in the space formed by the first ball washer and the second ball washer.

2. The caster according to claim 1, wherein the wheel comprises a wheel tread, a wheel core and a wheel cover, the wheel tread is disposed on an outer surface of the wheel core, and the wheel cover and the wheel core are connected by a second transmission device; and the wheel core is provided with a seat ring, and the first ball washer and the second ball washer are each embedded in the respective seat rings.

3. The caster according to claim 2, wherein the second transmission device comprises a plurality of second balls, one side face of the wheel core is provided with a first ball track, one side face of the wheel cover is provided with a second ball track, and the first ball track and the second ball track are oppositely disposed; and the plurality of second balls are scrollably connected between the first ball track and the second ball track.

4. The caster according to claim 3, wherein the first balls and the second balls are POM balls.

5. The caster according to claim 3, wherein the wheel cover is provided with a shaft hole through which the transmission screw passes, and both ends of the transmission screw are fixed to the bracket by fasteners.

6. The caster according to claim 3, wherein the wheel tread is connected to the wheel core by a lock catch.

* * * * *